(12) United States Patent
Eguchi et al.

(10) Patent No.: US 8,922,942 B2
(45) Date of Patent: Dec. 30, 2014

(54) MAGNETIC DISK APPARATUS

(75) Inventors: Takehiko Eguchi, Tokyo (JP); Shigeo Nakamura, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/124,724

(22) PCT Filed: Jun. 9, 2011

(86) PCT No.: PCT/JP2011/063256
§ 371 (c)(1),
(2), (4) Date: Dec. 8, 2013

(87) PCT Pub. No.: WO2012/169048
PCT Pub. Date: Dec. 13, 2012

(65) Prior Publication Data
US 2014/0111883 A1    Apr. 24, 2014

(51) Int. Cl.
*G11B 17/32* (2006.01)
(52) U.S. Cl.
USPC ........................................ 360/97.13
(58) Field of Classification Search
USPC ........................................ 360/97.13
See application file for complete search history.

(56) References Cited

U.S. PATENT DOCUMENTS

| | | | |
|---|---|---|---|
| 6,665,139 B2 | 12/2003 | Tokuyama et al. | |
| 7,085,098 B1 * | 8/2006 | Yang et al. | 360/97.13 |
| 7,397,631 B1 * | 7/2008 | Suwito et al. | 360/97.13 |
| 7,787,213 B1 * | 8/2010 | Michael et al. | 360/97.13 |
| 7,852,602 B2 * | 12/2010 | Suwa et al. | 360/97.13 |
| 7,929,246 B2 * | 4/2011 | Takemori et al. | 360/97.13 |
| 7,944,644 B2 * | 5/2011 | Kaneko et al. | 360/97.13 |
| 8,031,430 B2 * | 10/2011 | Chan et al. | 360/97.13 |
| 8,064,155 B2 * | 11/2011 | Teguri et al. | 360/71 |
| 8,194,345 B2 * | 6/2012 | Kwon et al. | 360/97.19 |
| 8,199,427 B2 * | 6/2012 | Murakami et al. | 360/97.13 |
| 8,228,631 B1 * | 7/2012 | Tsay et al. | 360/97.17 |
| 8,570,682 B2 * | 10/2013 | Ichikawa et al. | 360/97.12 |
| 8,619,386 B2 * | 12/2013 | Chan | 360/97.13 |

FOREIGN PATENT DOCUMENTS

| | | |
|---|---|---|
| JP | 04-047918 B2 | 8/1992 |
| JP | 11-232866 A | 8/1999 |
| JP | 11-297037 A | 10/1999 |

* cited by examiner

*Primary Examiner* — Mark Blouin

(74) *Attorney, Agent, or Firm* — Miles & Stockbridge P.C.

(57) ABSTRACT

In a magnetic, disk apparatus, flows around disks are stabilized, flow-induced vibration generated in the disks and a head positioning actuator is reduced, and the positioning accuracy of the head is improved.

In a magnetic disk apparatus including plural magnetic disks which are attached to a rotating motor and stacked with a spacer in between and a static structure that surrounds outer circumferences of the magnetic disks, plural current plates supported by the static structure are inserted between a pair of the magnetic disks in a stacking direction of the magnetic disks.

12 Claims, 13 Drawing Sheets

MAGNETIC DISK APPARATUS

TECHNICAL FIELD

The present invention relates to a magnetic disk apparatus and more particularly to a magnetic disk apparatus in which a flow-induced vibration generated in a disk is reduced.

BACKGROUND ART

The magnetic disk apparatus has a magnetic disk that is an information recording medium and a magnetic head to read and write magnetic information from and to the magnetic disk and includes a VCM actuator to support the magnetic head and move the magnetic head to a predetermined radial position over the magnetic disk. The magnetic information is written along a track circularly arranged on the magnetic disk. To correctly read and write the magnetic information, the magnetic head is required to be accurately positioned with respect to the track, so that, as the recording capacity and the recording density of the magnetic disk apparatus increase, a mechanism and a control method to achieve a higher positioning accuracy are required. One of the factors that degrade the positioning accuracy is the flow-induced vibration of the magnetic disk, which is called a disk flutter.

When the magnetic disk rotates, a complex air flow occurs in the magnetic disk apparatus. In particular, a high-speed and turbulent flow occurs around the magnetic disk, so that the disk flutter that is a vibration of the magnetic disk occurs due to pressure variation on the surface of the magnetic disk generated by the high-speed and turbulent flow. The disk flutter varies the position of the track to be followed by the magnetic head and degrades the positioning accuracy, so that reduction of the disk flutter is an important challenge to increase the recording density of the magnetic disk apparatus.

As one of the methods to reduce the disk flutter, a method for narrowing a gap between the magnetic disk and a shroud that covers the outer circumference of the magnetic disk, which is described in Patent Literature 1, and a method for inserting a partition member with a triangle cross section between disks, which is described in Patent Literature 2, are proposed. These methods suppress the turbulence of the air flow and reduce the disk flutter by stabilizing the flow around the magnetic disk by the shroud and the partition member. Further, as described in Patent Literature 3, a method for reducing the disk flutter by blowing air to the inner circumference of the disk is also known.

CITATION LIST

Patent Literature

Patent Literature 1: Japanese Unexamined Patent Application Publication No. 11(1999)-232866
Patent Literature 2: Japanese Examined Patent Application Publication No. 4(1992)-47918
Patent Literature 3: Japanese Unexamined Patent Application Publication No. 11(1999)-297037

SUMMARY OF INVENTION

Technical Problem

The disk flutter is caused by turbulence of flow around the disk, and there is an essential instability described below in the flow between the disks because the disks rotate. The air between the disks makes a flow rotating around a central motor in accordance with the rotation of the disks. The air between the disks receives a centrifugal force due to the rotation and receives a force to the outer circumferences of the disks. In the magnetic disk apparatus, the outer circumferences of the disks are covered by the shroud, so that a pressure distribution as shown by a solid line in FIG. 7, in which the pressure is high near the shroud and the pressure is low on the side of the inner circumferences of the disks, is formed. As a result, as shown in FIG. 3, flows 24 directed to outside are generated near the disks by the centrifugal force and flows 25 directed from the outer circumferences to the inner circumferences are generated near the center between the disks by a pressure difference between the inner circumferences and the outer circumferences of the disks. At this time, the flow 24 directed to the outer circumference and the flow 25 to the inner circumference are adjacent to each other in a small gap between the disks, so that strong shearing resistance occurs between them and the flows become unstable and very turbulent. The same goes for the structure described in Patent Literature 2, in which a partition plate is inserted between the disks. The turbulence of the flows results in causing a vibration of the disks or an actuator on which the head is mounted and becomes a cause of degrading the positioning accuracy of the head.

A method of Patent Literature 3 is to reduce the pressure difference between the inner circumferences and the outer circumferences of the disks and eliminate the instability of the flows by directly introducing air from the motor side to the inner circumferences of the disks. However, in order to secure a sufficient amount of air flow, a motor hub or a spacer that supports the disks has to be processed largely, so that there is a problem that the strength and accuracy are degraded and a static deformation of the disks generated when the disks are assembled increases.

An object of the present invention is to stabilize the flows around disks in the magnetic disk apparatus, reduce the flow-induced vibration generated in the disks and a head positioning actuator, and improve the head positioning accuracy.

Solution to Problem

To address the above problem, in the present invention, plural plates are arranged between the disks with a constant gap between each of the plates.

A typical example of the magnetic disk apparatus of the present invention is a magnetic disk apparatus including plural magnetic disks which are attached to a rotating motor and stacked with a spacer in between and a static structure that surrounds outer circumferences of the magnetic disks. In the magnetic disk apparatus, plural current plates supported by the static structure are inserted between a pair of the magnetic disks in a stacking direction of the magnetic disks, Advantageous Effects of Invention According to the present invention, the instability of the flows around the disks are reduced by reducing the pressure difference between the inner circumference and the outer circumference of the disks, which is generated when the disks are rotated, and separating the flow near the disk, which is directed to the outside, and the flow at the center between the disks, which is directed to the inside, so that it is possible to reduce the flow-induced vibration of components inside the magnetic disk apparatus, such as the disks and the actuator, and improve the positioning accuracy of the head.

DESCRIPTION OF EMBODIMENTS

Hereinafter, embodiments of the present invention will be described with reference to the drawings.

First Embodiment

Figure 1:
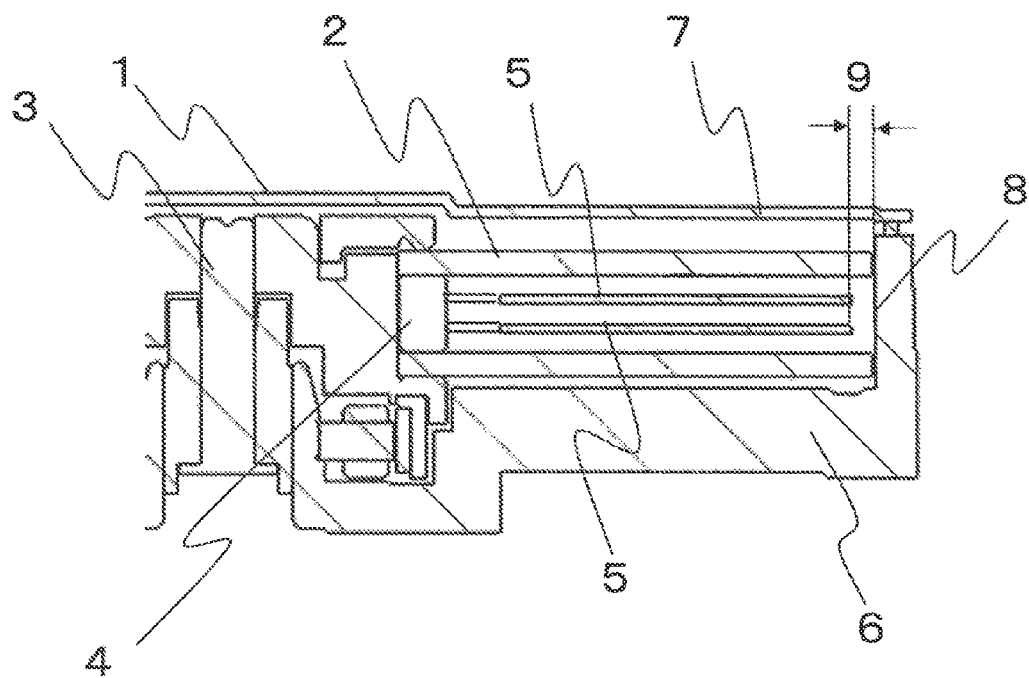
FIG. 1 is a cross-sectional view showing a magnetic disk apparatus of a first embodiment of the present invention.

FIG. 1 is a cross-sectional view showing a first embodiment of the present invention. In a magnetic disk apparatus 1, disks 2, on both sides of which information can be recorded, and a spindle motor 3, which drives and rotates the disks 2, are mounted. The disks 2 are attached to the spindle motor 3 with a spacer 4 in between. Two plates 5 are inserted between the disks 2. The spindle motor 3 and the plates 5 are attached to a base 6. A cover 7 is attached to a base 6 and components and air in the apparatus are sealed against the outside. A portion of the base 6, which faces the outer circumferences of the disks 2, is called a shroud 8, and a flow around the disks is arranged to be directed to the circumferential direction by the shroud 8. An appropriate gap 9 is provided between the plates 5 and the shroud 8 so that air flows without resistance. The shroud 8 works as a static structure. A distance between a disk 2 and a plate 5 and a distance between the plates 5 need to be as large as not to disturb the flow of the air, and generally, it is assumed that these distances are desired to be substantially the same.

Figure 2:
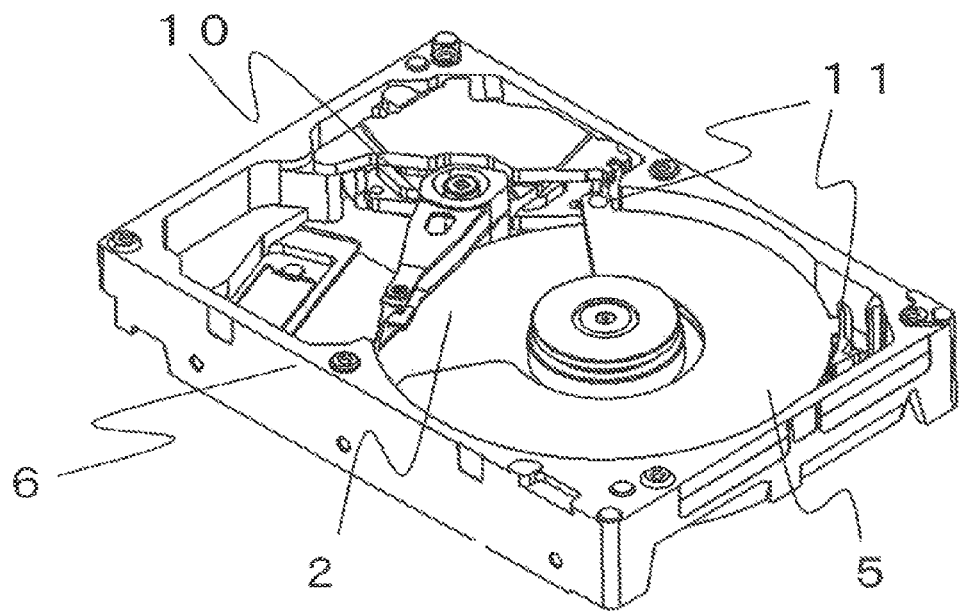
FIG. 2 is a perspective view showing the magnetic disk apparatus of the first embodiment of the present invention.

FIG. 2 is a perspective view showing the first embodiment of the present invention. FIG. 2 shows a state in which the cover 7 and the uppermost disk 2 are removed. An actuator 10 on which a magnetic head is mounted is placed in a portion over the disk 2. The plate 5 therefore has a fan shape formed by cutting off a part of a circular plate so that the plate 5 does not interfere with the actuator 10. The plate 5 is fixed to the base 6 by screws or the like at plural fixing portions 11 provided at the outer circumference. An appropriate gap is provided between the outer edge of the plate and the shroud 8 except for the fixing portions 11.

Figure 3:
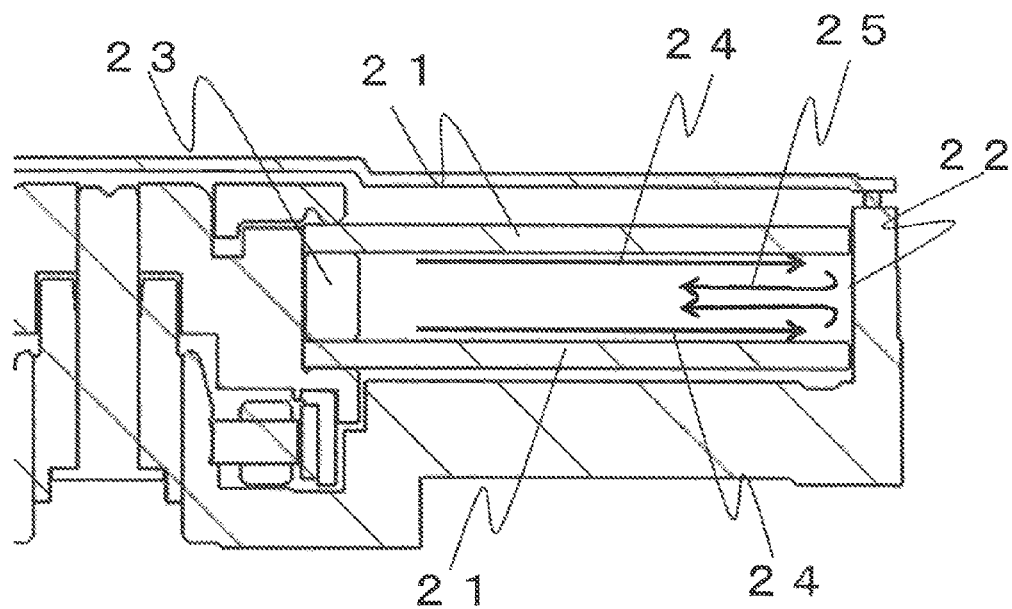
FIG. 3 is a schematic diagram showing flows between disks in a conventional technique.

FIG. 3 is a schematic diagram showing flows between disks in a conventional technique. When the disks 21 are rotated, the air near disks 21 receives a force directed to the outside by a centrifugal force. Thereby, the pressure near a shroud 22 increases and the pressure near a spacer 23 decreases relatively. By this pressure difference, the air away from the disks 21 receives a force directed to the inside. Therefore, a flow 24 directed to the outer circumference occurs near a disk 21 and a flow 25 directed to the inside occurs at a portion away from the disk 21.

Figure 4:
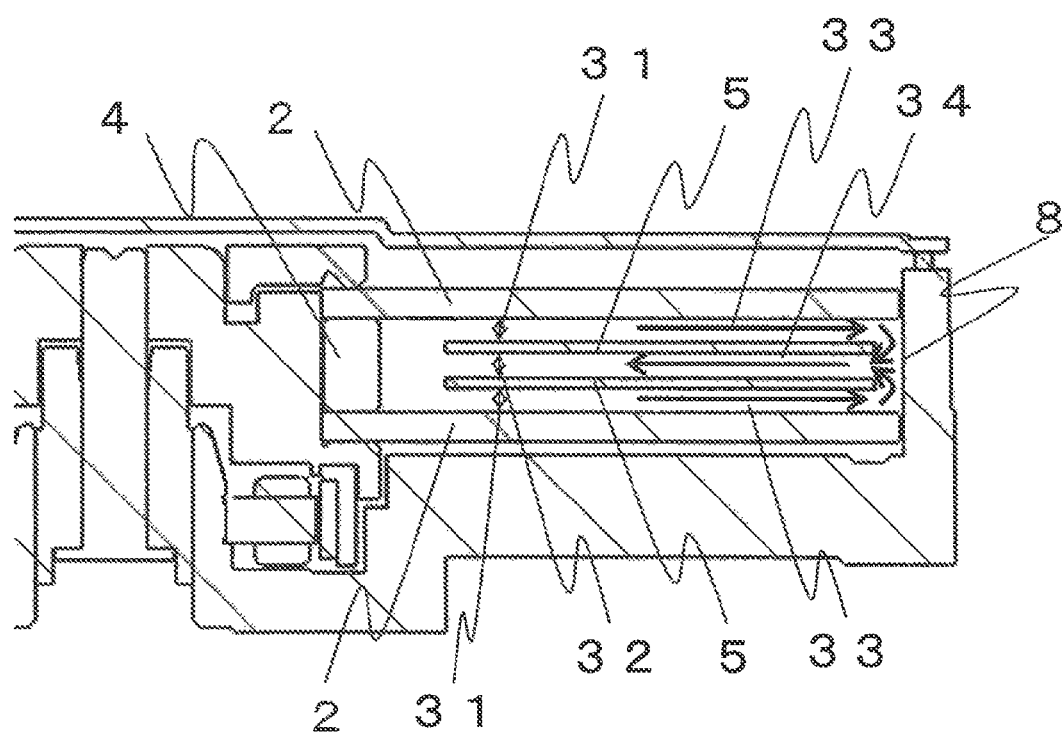
FIG. 4 is a schematic diagram showing flows between disks in the first embodiment of the present invention.

FIG. 4 is a schematic diagram showing flows between disks in the first embodiment of the present invention. The air between the disks 2 are divided into three regions by the two plates 5. In a region 31 in contact with the disk 2, when the disks 2 are rotated, the air receives a centrifugal force directed to the outside. In a region 32 sandwiched by the plates 5, the air is difficult to be influenced by the rotation of the disks 2, so that the air in the region 32 receives a force directed to the inside due to the pressure difference between the outer circumference and the inner circumference. Therefore, a flow 33 directed to the outside occurs in the region 31 and a flow 34 directed to the inside occurs in the region 2. As compared with the conventional technique in FIG. 3, in the present embodiment, the flow 33 directed to the outside and the flow 34 directed to the inside are separated from each other, so that the turbulence of the flow decreases. At the same time, the flow 34 directed to the inside alleviates the pressure difference between a portion near the shroud 8 and a portion near the spacer 4, so that the pressure difference between them decreases. As a result, the instability generated by the centrifugal force and the pressure difference between the inner and the outer circumferences of the disks is alleviated. The flows between the disks are stabilized, so that it is possible to reduce the flow-induced vibration generated in the disks 2 and the actuator 10. The plates 5 work as current plates.

Figure 5:
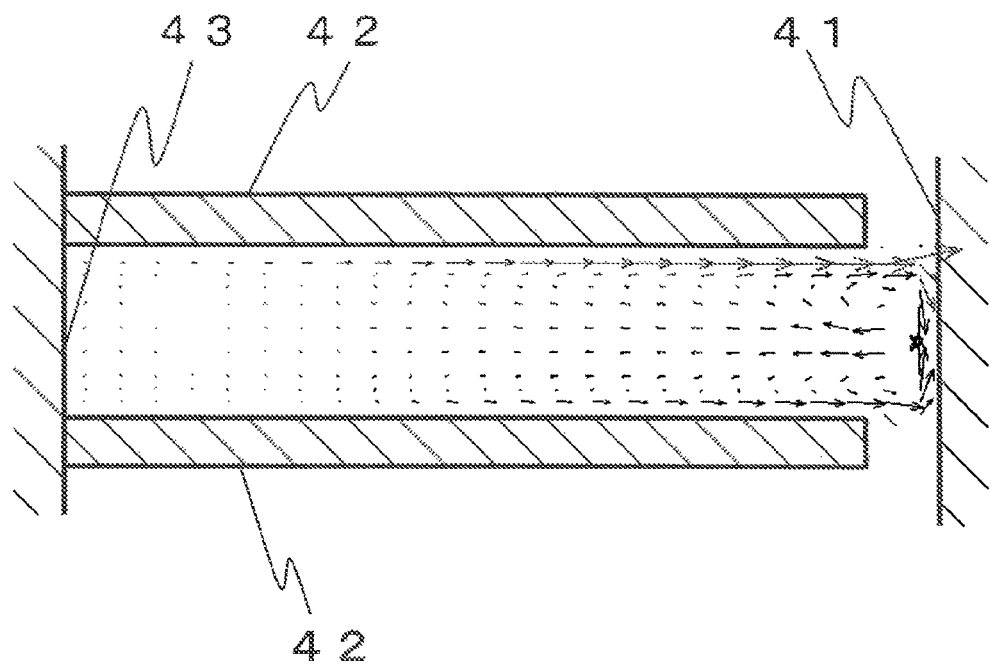
FIG. 5 is a cross-sectional view showing a simulation result of flows between disks under a condition in which the conventional technique is simulated.

FIG. 5 is a simulation result of flows between two rotating disks 42 surrounded by a shroud 41 of the conventional technique. The direction and the magnitude of the flow of the air between the disks 42 in a cross-section passing through the rotation center of the disks 42 are shown by arrows. In the simulation, the disks 42 and a rotor 43 are rotating and the shroud 41 is stationary. The simulation result shows that a flow directed to the outer circumference occurs near the disk and a flow directed to the inner circumference occurs near the center between the disks as shown in FIG. 3, and it is known that these flows opposite to each other are adjacent to each other.

Figure 6:
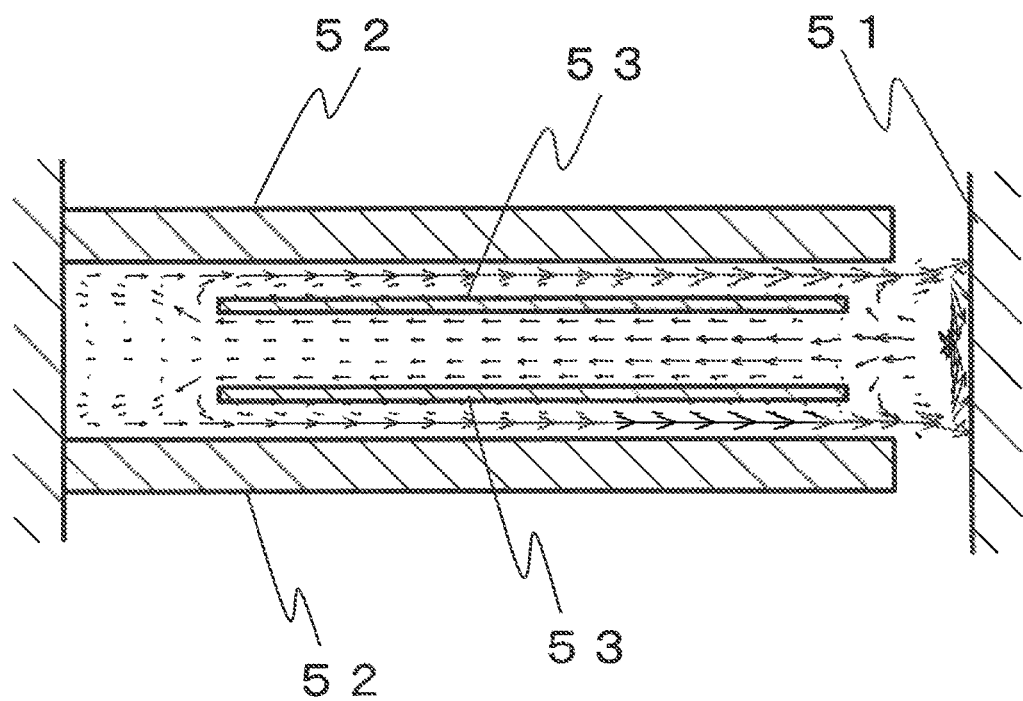
FIG. 6 is a cross-sectional view showing a simulation result of flows between disks under a condition in which the first embodiment of the present invention is simulated.

FIG. 6 is a simulation result of flows in a case in which two stationary plates 53 are inserted between two rotating disks 52 surrounded by a shroud 51 of the first embodiment. In the same manner as in FIG. 5, the direction and the magnitude of the flow of the air between the disks 52 in a cross-section passing through the rotation center of the disks 52 are shown by arrows. The simulation result shows that a flow directed to the outer circumference occurs between the disk 52 and the plate 53 and a flow directed to the inner circumference occurs between the plates 53 as shown in FIG. 4, and these flows are separated from each other by the plate 53.

Figure 7:
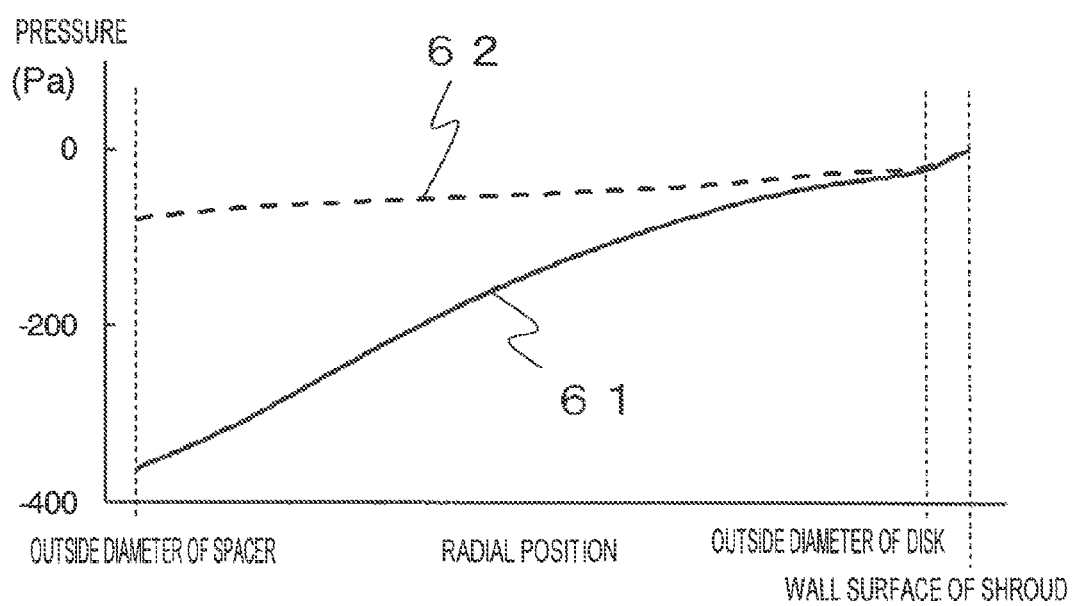
FIG. 7 is a graph showing pressure distribution obtained by simulations.

FIG. 7 is a graph showing pressure distributions between the disks obtained by the simulations shown in FIGS. 5 and 6. The horizontal axis represents a radial position of a pressure measurement point. The left end represents the outside diameter of the spacer, the right end represents a wall surface of the shroud, and the outside diameter of the disk is located slightly left (inner) from the shroud. The vertical axis represents a time average value of the pressure at the height of the center between the disks. The solid line represents a result of a case 61 in which there is no plate and the dashed line represents a result of a case 62 in which two plates are inserted. Both simulation results are displayed by using the same origin so that the pressure near the shroud wall is 0 Pa. It is known that the pressure difference between a portion near the spacer and a portion near the shroud, which is the cause of the instability of the flows, significantly decreases when the two plates are inserted.

Figure 8:
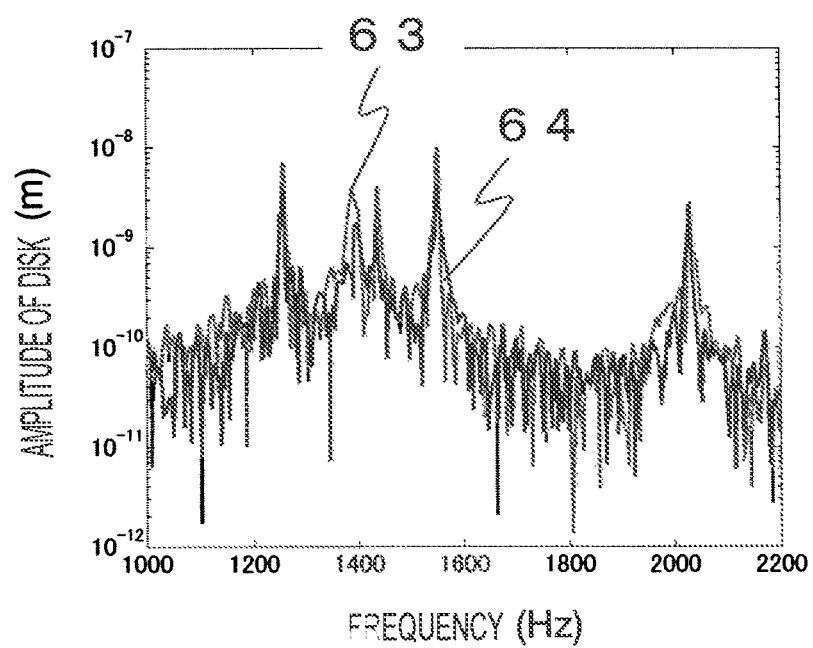
FIG. 8 is a graph showing a frequency spectrum of disk vibration obtained by the simulations.
Figure 9:
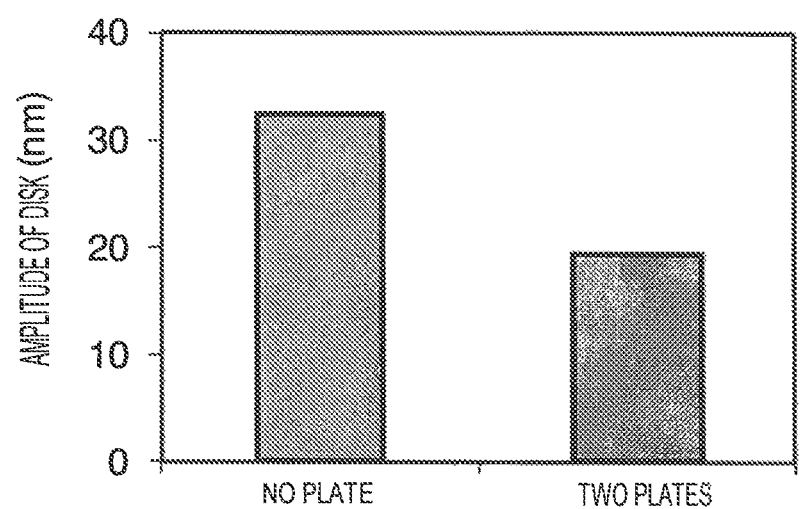
FIG. 9 is a graph showing disk amplitude obtained by the simulations.

FIG. 8 is calculation values of a frequency spectrum of disk vibration obtained by the simulations. The gray line represents a spectrum 63 of the case in which there is no plate and the black line represents a spectrum 64 of the case in which two plates are inserted. FIG. 9 shows amplitude values of the disks obtained by integrating the frequency spectra. It is known that the vibration in the case in which two plates are used is reduced compared with the case in which there is no plate.

Second Embodiment

Figure 10:
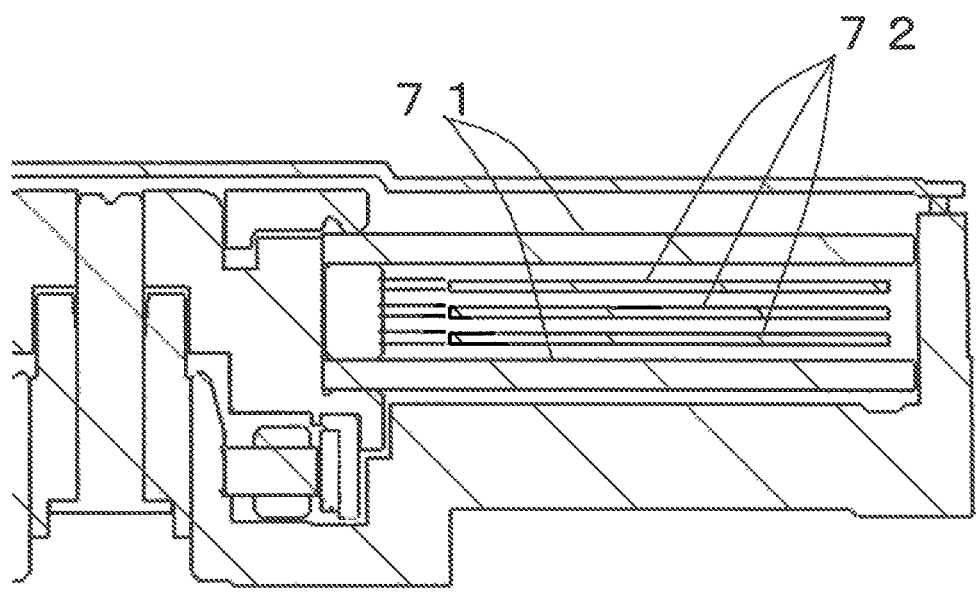
FIG. 10 is a cross-sectional view showing a magnetic disk apparatus of a second embodiment of the present invention.

FIG. 10 is a cross-sectional view showing a second embodiment of the present invention. Three plates 72 are inserted between two disks 71. Although the number of the plates between the disks is two in the first embodiment, when the number of the plates is three or more, the function and effect to stabilize the flows and reduce the flow-induced vibration are the same. However, in an actual magnetic disk apparatus, the dimension in the height direction is limited. If the number of the plates is increased, the necessary height dimension increases according to the number of the plates. Therefore, a practical number of the plates is desired to be two that is the minimum number by which the effect of the present invention can be obtained.

Third Embodiment

Figure 11:
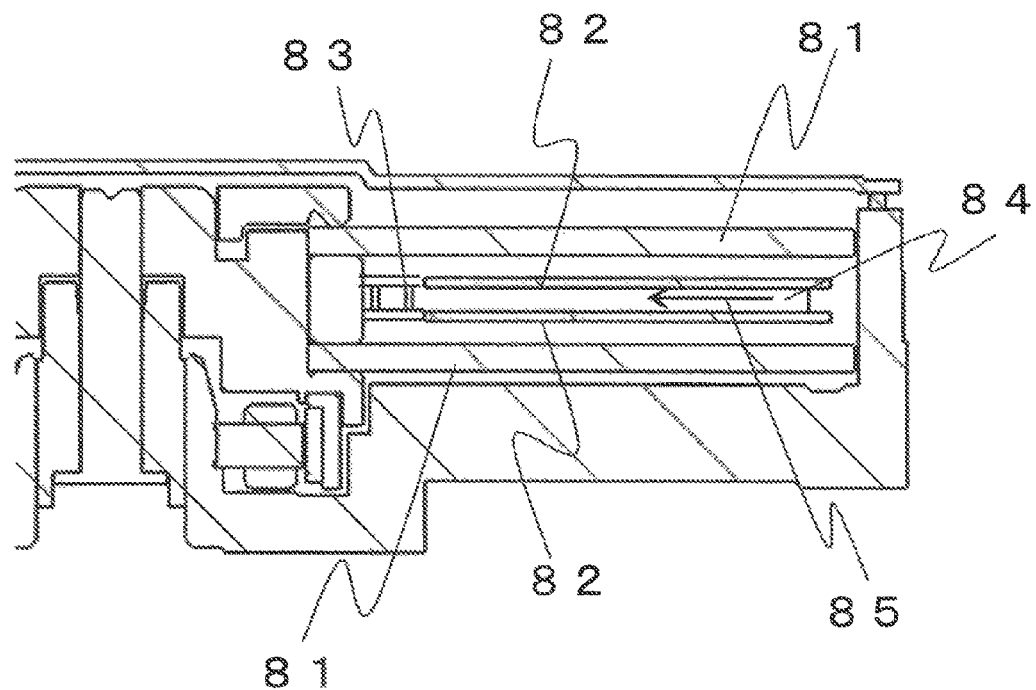
FIG. 11 is a cross-sectional view showing a magnetic disk apparatus of a third embodiment of the present invention.

FIG. 11 is a cross-sectional view showing a third embodiment of the present invention. Two plates 82 are inserted between two disks 81 and the plates 82 are connected by ribs 83. The rib 83 has a rod shape long in the radial direction and does not block a flow 85 directed to the inner circumference in a region 84 between the plates 82. The rigidity of the structure in which the plates 82 are connected by the ribs 83 is significantly increased compared with a case in which there is no rib 83, so that deformation of the plates 82 due to impact acceleration or the like applied from the outside of the magnetic disk apparatus can be suppressed to be small. Although the rib 83 does not block the flow in the radial direction in the region 84 between the plates, the rib 83 blocks a flow in the circumferential direction. The flow velocity in the circumferential direction in the region 84 decreases, so that the centrifugal force applied to the air in the region 84 decreases. Therefore, the pressure difference between a portion near the shroud and a portion near the spacer further decreases compared with the case of the first embodiment in which there is no rib 83. The ribs 83 may be provided by being inclined from the radial direction. The shape of the rib 83 is not limited to a long rod shape, but any ribs 83 which connect the two plates with a distance in between may be used, such as cylindrical ribs are separately provided between the plates.

Figure 12:
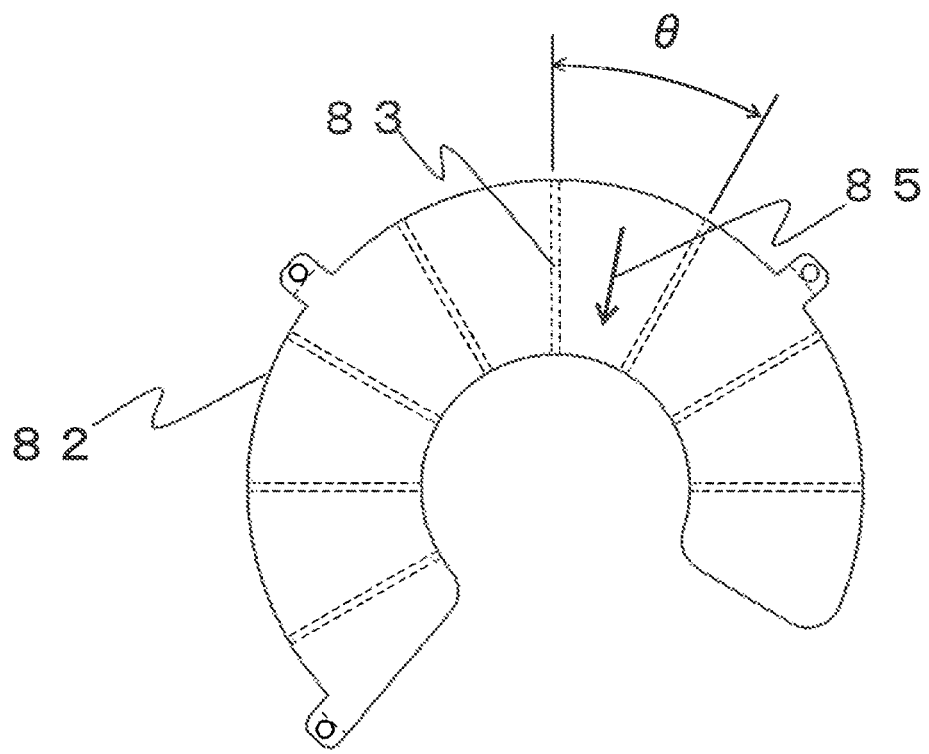
FIG. 12 is a plan view showing a plate of the third embodiment of the present invention.

FIG. 12 is a plan view showing the plate of the third embodiment of the present invention. The angle at which the ribs 83 are arranged is desired to be set so that the ribs 83 do not disturb the flow between the plates 82 in the radial direction and contribute to increase the out-of-plane bending rigidity of the plates 82. Specifically, the angle θ between the ribs is desired to be in a range between 10 degrees and 90 degrees.

Figure 13:
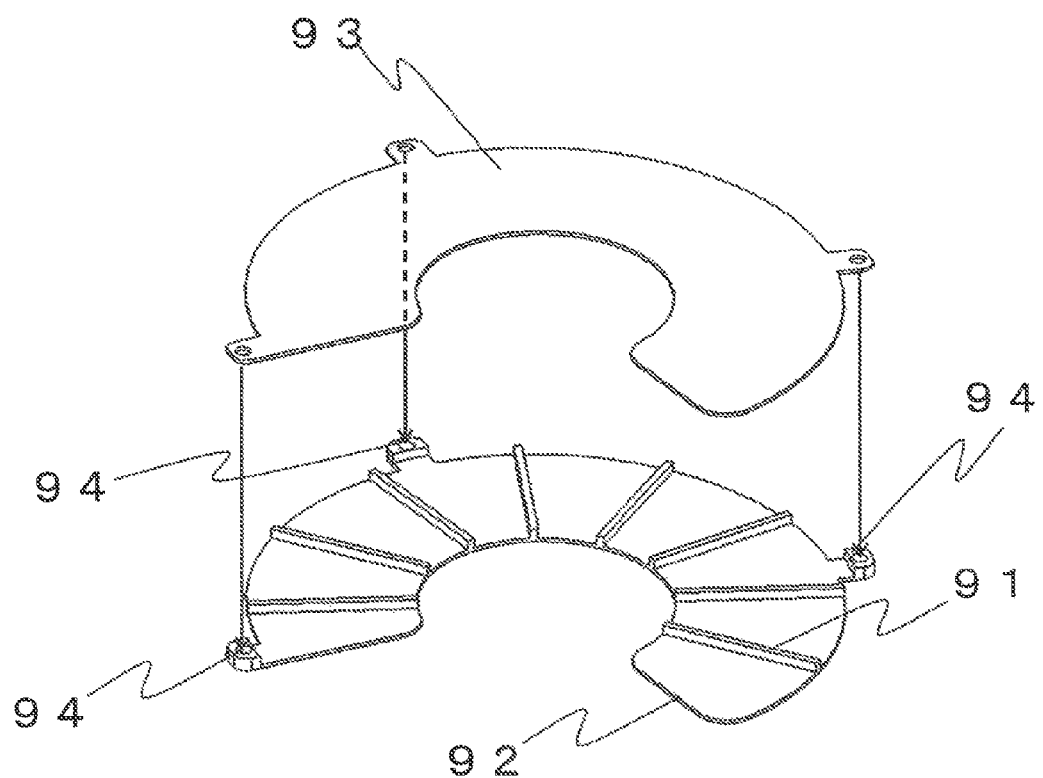
FIG. 13 is an exploded perspective view showing a manufacturing method of the plates of the third embodiment of the present invention.

FIG. 13 is an exploded perspective view showing a manufacturing method of the plates shown in the third embodiment of the present invention. A plate 92 on which ribs 91 are integrally formed and another plate 93 are overlapped and the upper surfaces of the ribs 91 and the lower surface of the plate 93 that faces the upper surfaces of the ribs 91 are bonded together while positioning is performed by assembling holes 94. The material of the plate 91 and the plate 93 is desired to be a metallic material, such as an aluminum alloy, with plating on the surface of the metallic material, or a resin material such as engineering plastics.

LIST OF REFERENCE SIGNS

1 Magnetic disk apparatus
2 Disk
3 Spindle motor
4 Spacer
5 Plate
6 Base
7 Cover
8 Shroud
9 Gap
10 Actuator
11 Fixing portion
21 Disk
22 Shroud
23 Spacer
24 Flow directed to the outside
25 Flow directed to the inside
31 Region in contact with the disk 2
32 Region sandwiched by the plates 5
33 Flow directed to the outside
34 Flow directed to the inside
41 Shroud
42 Disk
43 Rotor
51 Shroud
52 Disk
53 Plate
61 Case in which there is no plate
62 Case in which two plates are inserted
63 Spectrum of the case in which there is no plate
64 Spectrum of the case in which two plates are inserted
71 Disk
72 Plate
81 Disk
82 Plate
83 Rib
84 Region between the plates 82
85 Flow directed to the inner circumference
91 Rib
92 Plate
93 Plate
94 Assembling hole

The invention claimed is:

1. A magnetic disk apparatus comprising: a plurality of magnetic disks which are attached to a rotating motor and stacked with a spacer in between; and a static structure that surrounds outer circumferences of the magnetic disks,
wherein a plurality of current plates supported by the static structure are inserted between a pair of the magnetic disks that are adjacent to each other in a stacking direction of the magnetic disks.

2. The magnetic disk apparatus according to claim 1, wherein
the number of the current plates is two.

3. The magnetic disk apparatus according to claim 1, wherein
a gap in which air flows is provided between an outer circumference of each current plate and the static structure except for an attaching portion of the current plate attached to the static structure.

4. The magnetic disk apparatus according to claim 2, wherein a gap in which air flows is provided between an outer circumference of each current plate and the static structure except for an attaching portion of the current plate attached to the static structure.

5. The magnetic disk apparatus according to claim 1, wherein
the plurality of current plates has a structure in which current plates are connected to each other by a rib.

6. The magnetic disk apparatus according to claim 5, wherein
the rib has a long and narrow shape extending in a radial direction of the magnetic disks.

7. The magnetic disk apparatus according to claim 2, wherein
the two current plates have a structure in which the current plates are connected to each other by a rib.

8. The magnetic disk apparatus according to claim 7, wherein
the rib has a long and narrow shape extending in a radial direction of the magnetic disks.

9. The magnetic disk apparatus according to claim 3, wherein
the plurality of the current plates has a structure in which current plates are connected to each other by a rib.

10. The magnetic disk apparatus according to claim 9, wherein
the rib has a long and narrow shape extending in a radial direction of the magnetic disks.

11. The magnetic disk apparatus according to claim 4, wherein
the two current plates have a structure in which the current plates are connected to each other by a rib.

12. The magnetic disk apparatus according to claim 11, wherein
the rib has a long and narrow shape extending in a radial direction of the magnetic disks.

* * * * *